United States Patent [19]
Owen

[11] 3,903,016
[45] Sept. 2, 1975

[54] METHOD FOR REGENERATING CATALYST IN A FLUIDIZED BED WITH A RESTRICTED HIGH TURBULENCE REGION IN THE DISPERSED PHASE

[75] Inventor: Hartley Owen, Belle Mead, N.J.

[73] Assignee: Mobil Oil Corporation, New York, N.Y.

[22] Filed: May 4, 1973

[21] Appl. No.: 357,298

[52] U.S. Cl............ 252/417; 23/288 B; 23/288 S; 208/120; 208/164
[51] Int. Cl.².. B01J 37/12; B01D 15/06; B01J 8/00
[58] Field of Search............ 252/417; 208/120, 164; 23/288 B, 288 S

[56] References Cited
UNITED STATES PATENTS

| | | | |
|---|---|---|---|
| 2,382,382 | 8/1945 | Carlsmith | 252/417 |
| 2,929,774 | 3/1960 | Smith | 252/417 |
| 3,502,574 | 3/1970 | Baillie | 208/153 |
| 3,565,790 | 2/1971 | Schwarzenbek | 208/153 |
| 3,838,036 | 9/1974 | Stine et al. | 252/417 |
| 3,844,973 | 10/1974 | Conner et al. | 252/417 |

Primary Examiner—Winston A. Douglas
Assistant Examiner—P. E. Konopka
Attorney, Agent, or Firm—Charles A. Huggett; Carl D. Farnsworth

[57] ABSTRACT

Apparatus and the method of utilizing the apparatus for the regeneration of catalyst is described wherein spent catalyst is introduced adjacent the upper interface of a dense fluid bed of regenerated catalyst and carried in a substantial amount into a dispersed catalyst phase; regeneration gas introduced to a lower portion of said dense fluid catalyst bed and the dispersed catalyst phase complete the conversion of carbonaceous material to carbon dioxide; an inverted conical member positioned in the dispersed catalyst phase funnels catalyst dispersed in flue gas through a restricted opening promoting turbulence before entering the upper part of the regenerator housing cyclonic separation means; oxygen containing gas introduced to the dispersed catalyst phase at the restricted opening promotes the conversion of carbon monoxide and catalyst particles separated from flue gases above the conical baffle are returned as an annular stream to the dense catalyst bed adjacent the regenerator wall.

5 Claims, 2 Drawing Figures

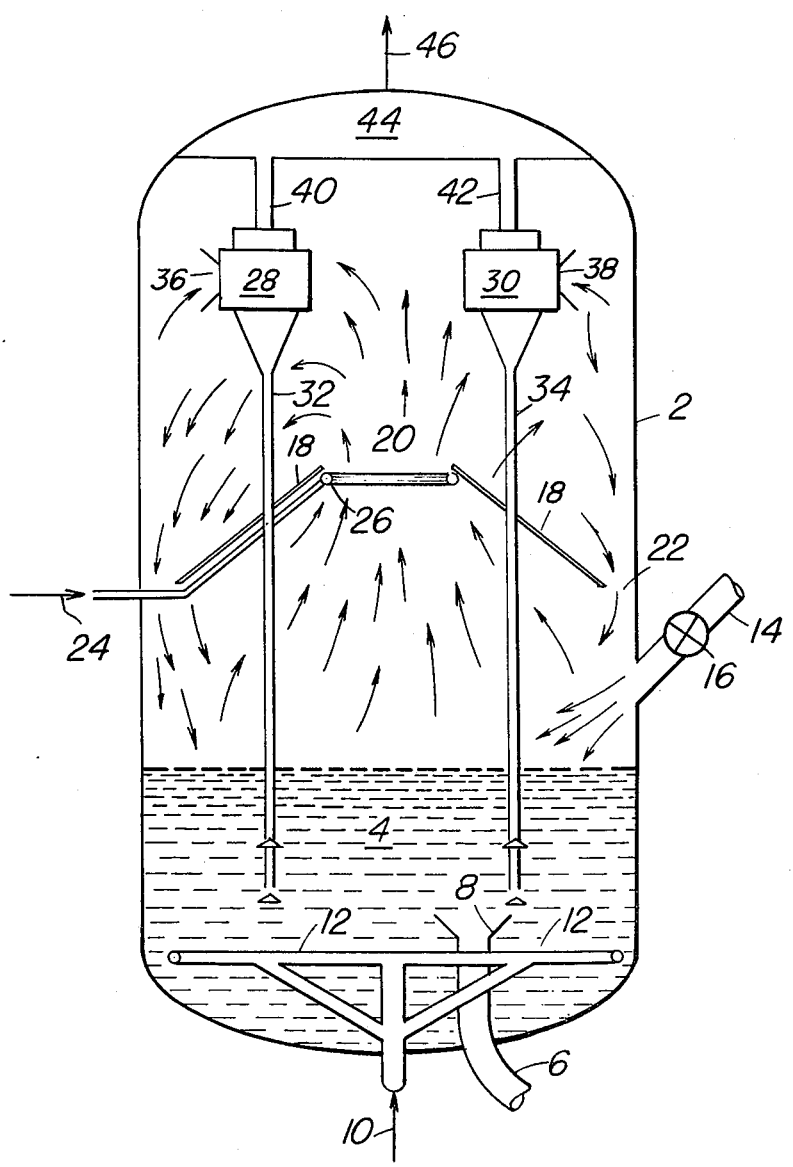
FIGURE I

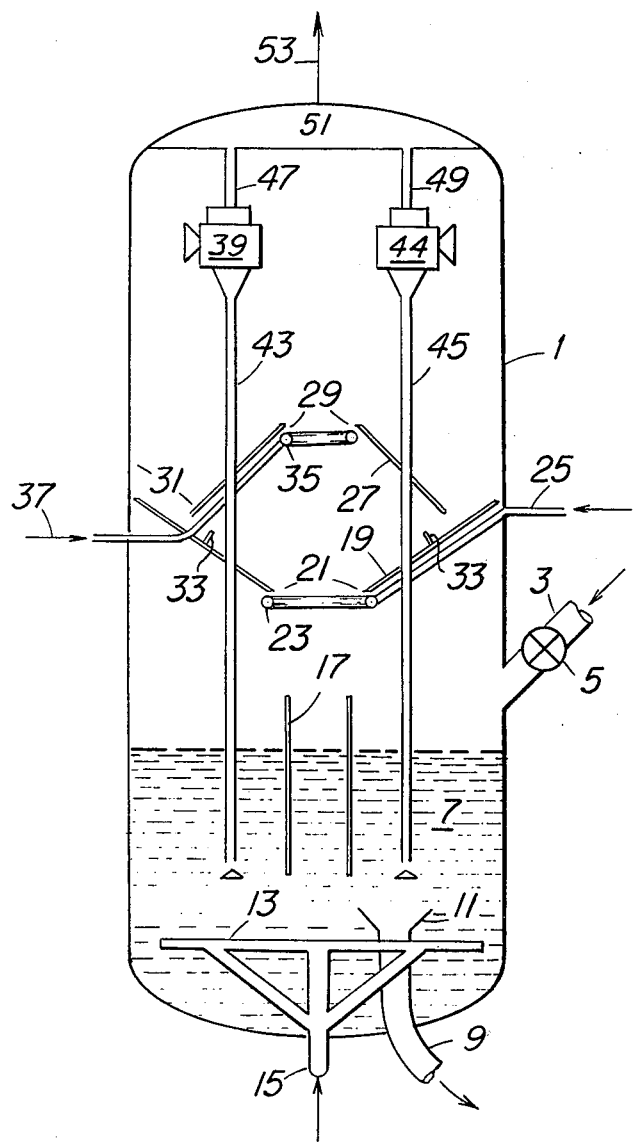
FIGURE II 3,903,016

METHOD FOR REGENERATING CATALYST IN A FLUIDIZED BED WITH A RESTRICTED HIGH TURBULENCE REGION IN THE DISPERSED PHASE

BACKGROUND OF THE INVENTION

The technology of contacting finely divided solid particles with gasiform material to obtain conversion of the solid particles, extraction of the particles or the removal of deposited materials therefrom wherein the solids are maintained in a dense fluid phase condition are plagued with problems associated with obtaining a relatively uniform contact between supplied gasiform material and solid particle material. Thus in large dense fluid bed operations such as employed in the regeneration of catalyst, means for obtaining a uniform distribution of regeneration gas throughout the catalyst bed to obtain a uniform and substantially complete removal of carbonaceous deposits from the catalyst particles has been a source of constant consideration and investigation to obtain improved results. The problems of regenerating catalyst have been aggravated to some extent with the development of more active and selective cracking catalysts; that is, cracking catalysts that are more selective at high temperatures and particularly those of low coke producing characteristics. Furthermore, to take advantage of the catalyst potential for converting hydrocarbons, it is important to obtain a complete removal of deposited carbonaceous material and heating thereof before return at an elevated temperature to the hydrocarbon conversion step. The present invention is concerned with the method and apparatus for exercising control on the mixing of regeneration gasiform material and contaminated catalyst particles introduced to a bed of regenerated catalyst particles maintained in a dense fluid bed condition in a regeneration zone.

SUMMARY OF THE INVENTION

The present invention is concerned with the method and means or a system for contacting finely divided catalyst particles of a fluidizable particle size range with gasiform material. In a more particular aspect the present invention is concerned with the regeneration of fluidizable catalyst particles under conditions to remove deactivating carbonaceous deposits therefrom and obtain the conversion of formed carbon monoxide to carbon dioxide in a manner promoting the recovery of available heat by the catalyst particles.

In the method and system of the present invention, the solid catalyst particles containing deactivating carbonaceous deposits are regenerated in a relatively dense catalyst bed phase and a more dilute catalyst phase thereabove particularly promoted by the method of combining contaminated catalyst with regenerated catalyst and the addition of oxygen containing regeneration gas to the catalyst to be regenerated. In a particular embodiment regeneration gas is supplied to a bottom and upper portion of the catalyst being regenerated in an amount promoting a dispersed catalyst phase above a more dense fluid catalyst bed. The conversion of carbon containing constituents and particularly carbon monoxide is promoted in the dispersed catalyst phase by the separate addition of oxygen containing regeneration gas in a restricted relatively high velocity region through which flue gases carrying dispersed phase catalyst passes. Thus the conversion of formed carbon monoxide existing in the gaseous products of combustion is particularly promoted in the restricted region of relatively high turbulence provided by the baffle control opening thereby assuring good catalyst particle-flue gas mixing contributing to excellent heat exchange characteristics therebetween before effecting separation of the thus heated and regenerated catalyst particles from flue gases by the combination of hindered settling and cyclonic means.

In the regenerator arrangement herein described, the cyclonic separation means returns hot regenerated catalyst to a relatively low portion of a dense fluid catalyst bed maintained in a lower section or region of the regenerator but above the point of withdrawal of regenerated catalyst for use in further hydrocarbon conversion reactions. Also regenerated catalyst particles separated as by a change-in velocity in the upper portion of the regenerator above the large inverted conical baffle member is caused to flow to the baffle periphery by virtue of the baffle slope being greater than the catalyst angle of repose. The catalyst particles so directed then fall as an annular curtain of catalyst particles onto the upper surface of the more dense fluid bed of catalyst below the conical baffle at substantially the regenerator walls. Thus the regeneration system of the present invention provides a relatively high circulation of regenerated catalyst to an upper and lower portion of a fluid bed of catalyst in the lower portion of the regenerator without causing excessive errosion of regenerator cyclonic separation equipment. The system of the present invention also increases the circulation of catalyst during regeneration and that passed from the dense catalyst phase into the dispersed catalyst and return to the dense catalyst phase. Also the generation of available heat by assuring the combustion of carbon monoxide and the recovery of generated heat by the catalyst is promoted within the dispersed phase system of the apparatus by increasing turbulence of the suspension during burning of carbon monoxide in the presence of sufficient catalyst particles to adsorb the heat thus generated.

In the method and system of the present invention catalyst circulation rates from the dense catalyst phase into the dispersed catalyst phase and return thereof to the dense catalyst phase may be within the range of 0.3 up to about 4.0 times the amount of catalyst circulated to the reactor. The deactivated or contaminated catalyst containing carbonaceous deposits of hydrocarbon conversion is introduced into the regenerator in a region of relatively high catalyst temperature preferably adjacent the upper interface of a dense bed of catalyst wherein the contaminated catalyst is mixed with sufficient high temperature regenerated catalyst to form a mix temperature promoting the combustion of carbonaceous deposits. Thus the contaminated catalyst is mixed with regenerated catalyst to form a catalyst mixture in which the ratio of regenerated catalyst to contaminated catalyst is at least 1.0 and preferably 2 or greater at a temperature of at least 1200°F. and as high as 1400°F. Thereafter catalyst particles entrained with the gaseous products of combustion and containing carbon monoxide are carried in a substantial amount into the dispersed catalyst phase and caused to move through a restricted region of high turbulence wherein additional oxygen containing regeneration gas is introduced to complete the combustion of carbon monoxide to carbon dioxide thereby further raising the temperature of the dispersed phase mixture to an elevated temperature of at least 1300°F. and as high as about 1500°F. The high temperature dispersed catalyst phase thus formed is caused to separate by a change in velocity promoting the settling of catalyst particles from the flue gases before the flue gases enter the cyclonic separator.

Although only two cyclone separators are shown, it is to be understood that there are a plurality of such separators, such as six or more thereof, arranged in a circle within the regenerator vessel and about its vertical axis. The opening to each primary cyclone separator is faced about 90° from the wall of the regenerator so that separation of catalyst particles from flue gases will be particularly promoted in a region of reduced velocity above the inverted conical baffle member. Thus the upflow of catalyst particles from the dense catalyst bed into the dispersed catalyst phase can be increased to a relatively high factor before any significant influence on cyclonic equipment is encountered. Furthermore, as the amount of catalyst carried into the dispersed catalyst phase is increased so is the downflow of hot regenerated catalyst at the regenerator wall increased thereby contributing to the overall circulation of the catalyst in the system.

BRIEF DESCRIPTION OF THE DRAWINGS

FIG. I presents diagrammatically in elevation one arrangement of apparatus comprising an inverted conical frustum baffle in the regenerator dispersed catalyst phase.

FIG. II presents diagrammatically in elevation a variation on the arrangement of FIG. I including a second annular baffle extending inwardly and sloping downwardly from the regenerator wall in conjunction with a coaxially aligned vertical cylindrical baffle confined in an upper portion of a dense fluid bed of catalyst in the lower portion of the regenerator vessel.

DISCUSSION OF SPECIFIC EMBODIMENTS

Referring now to FIG. I there is shown a regenerator vessel 2 within which is housed in the lower portion thereof a dense fluid bed of catalyst particles 4. A regenerated catalyst withdrawal conduit or standpipe 6 provided with a funnel shaped inlet 8 extends downwardly from a lower portion of the dense fluid bed of catalyst 4. Regeneration gas such as air or other appropriate oxygen containing gas introduced by conduit 10 passes into an air distributor 12 positioned across a lower cross-section of the catalyst bed. Distributor 12 is a multi-segmented grid arrangement designed to pass and distribute regeneration gas over the cross sectional area of the catalyst bed under velocity condition which will fluidize the catalyst bed so that the density of the catalyst bed above the air distributor may be made to vary as desired over a range of less than about 30 lbs/cu.ft. up to about 35 lbs/cu.ft. A spent or contaminated catalyst inlet conduit 14 provided with flow control valve 16 introduces contaminated catalyst containing carbonaceous deposits to be regenerated into the vessel 2 and generally in a region which is adjacent to and usually above the upper interface of the more dense catalyst bed phase. An inverted conical baffle 18 provided with a central restricted opening 20 is coaxially positioned within an upper intermediate portion of vessel 2 above catalyst inlet conduit 14 and is of a diameter which will provide a restricted annular opening 22 with respect to the regenerator vessel wall. Conical baffle 18 is provided with a slope which is at least equal and preferably greater than the angle of repose of catalyst particles used in the system. The baffle slope is sufficiently greater than the catalyst angle of repose so that no significant buildup of catalyst on the upper baffle surface will be encountered. It is contemplated as more fully discussed below of inverting the conical baffle from the position shown in the drawing so that settled catalyst particles will pass to the restricted control opening rather than to the baffle periphery as shown in the drawing.

In the arrangement of the drawing of FIG. I secondary regeneration gas such as air is introduced by conduit 24 to an air distributor ring 26 adjacent the restricted central opening of the baffle to provide an amount of oxygen sufficient to complete at least the conversion of formed carbon monoxide to carbon dioxide in the dispersed phase of catalyst as the flue gases pass from the more dense phase of catalyst in the lower portion of the regenerator vessel to an upper portion thereof before final separation by cyclonic means.

A plurality of cyclonic separators 28 and 30 provided with separated catalyst diplegs 32 and 34 respectively are positioned in an upper portion of the vessel 2 and above the inverted conical baffle 18. There are a plurality of such cyclone separator means arranged in a circle about the vessel vertical axis. The openings 36 and 38 to the cyclone separators are positioned preferably 90° away from the reactor wall rather than as shown on the drawing for reasons of simplicity. Diplegs 32 and 34 pass downwardly through baffle 18 and into a lower portion of the dense catalyst bed 4 for discharge above distributor grid 12 and preferably above the funnel shaped withdrawal opening 8 for conduit 6. Withdrawal conduits 40 and 42 connected to cyclone means 28 and 30 pass flue gas into a plenum chamber 44 from which flue gases are removed by conduit 46.

In the method of operation of the system represented by the apparatus of FIG. I, a fluid bed of catalyst at a temperature in the range of from about 1,250°F. up to about 1,400°F. obtained by the burning of carbonaceous material with oxygen containing gas is maintained in the lower portion of the regeneration vessel 2. A portion of this hot regenerated catalyst is withdrawn from a lower portion of the dense catalyst bed for use in a hydrocarbon conversion zone not shown. Hot regenerated catalyst in an upper portion of the more dense catalyst bed is mixed with the contaminated catalyst introduced by conduit 14 to provide a catalyst mixture of at least 1,200°F. which is immediately subjected to carbon burning by hot regeneration air passed upwardly through catalyst bed 4 from air distributor 12. In the method and arrangement of FIG. I it is contemplated lifting a considerable amount of catalyst from the more dense catalyst phase into a less dense catalyst phase region known as the dispersed catalyst phase wherein the density of catalyst in regeneration flue gases may be within the range of about 3 to 10 lbs/cu. ft. Thus in the less dense or dispersed catalyst phase region of the regenerator between the baffle and catalyst inlet, the density of catalyst may be within the range of from about 5 to 20 lbs/cu.ft. and in the range of from about 1 to about .5 lbs/cu.ft. above the baffle wherein conversion of carbon monoxide to carbon dioxide is assured by the introduction of secondary air or oxygen containing gas into the suspension of catalyst and flue gas passing through the central restricted opening 20 of baffle 18.

The catalyst suspension passed into the region of the regenerator above baffle 18 is at an elevated temperature up to about 1,400° or 1,500°F. by virtue of carbon monoxide conversion to carbon dioxide in the regeneration zone. The dispersed phase high temperature suspension thus formed is then caused to be separated by a change in velocity promoting hindered settling of the catalyst particles from the flue gases followed by cyclonic separation of any entrained catalyst particles from flue gases. The cyclonically separated catalyst particles are returned by cyclone diplegs to a relatively low level of the dense catalyst bed 4. The catalyst separated by hindered settling is directed to the sloping baffle periphery for flow through an annular space onto the more dense catalyst bed therebelow. Thus an annular curtain of hot regenerated catalyst solids passes from the baffle periphery onto the bed of catalyst being regenerated therebelow. Flue gases separated by cyclonic means are removed from an upper portion of the regeneration vessel by its plenum chamber 44 and connecting withdrawal conduit 46.

As mentioned above, baffle 18 may be inverted so that catalyst separated from the dispersed phase above the baffle may be caused to flow to the baffle central opening. In this arrangement the central opening of the baffle may be sized so that hot catalyst flowing downwardly therethrough will tend to choke the flow of the suspension passing upwardly therethrough. This chocking action will improve upon the contact between regeneration gas and catalyst particles and promote desired heat exchange in the conversion of carbon monoxide to carbon dioxide. In this latter arrangement it is contemplated extending the conical baffle to substantially the walls of the regenerator so that only very limited or restricted flow of flue gas will pass upwardly through any annular space between the baffle periphery and the wall of the regenerator.

Referring now to FIG. II there is shown diagrammatically in elevation a variation on the arrangement of the apparatus of FIG. I in which the inverted conical baffle is positioned in the upper portion of the regenerator is positioned above an annular conical baffle extending inwardly and downwardly from the regenerator wall so that catalyst separated in the dispersed phase can be returned by the spaced apart baffles to a central portion of the fluid bed of catalyst therebelow. The centrally returned catalyst will encounter heat exchange with flue gases and catalyst carried into the dispersed catalyst phase. In FIG. II there is shown a vessel 1 for regenerating catalyst by burning carbonaceous deposits on the catalyst with oxygen containing regeneration gas such as air. Spent catalyst containing deactivating deposits of carbonaceous material is introduced to vessel 1 by conduit 3 provided with flow control valve 5. Conduit 3 may introduce the catalyst tangentially and downwardly into the vessel for discharge into an upper portion of the fluid bed of catalyst 7 maintained in a lower portion of the regeneration vessel. Regenerated catalyst is withdrawn by conduit 9 provided with a funnel shaped inlet 11 positioned most usually above an air distributor grid 13. Distributor grid 13 located in the lower portion of the catalyst bed is supplied with regeneration gas such as air or oxygen supplemented air introduced by conduit 15. A vertical cylindrical baffle member 17 open at each end is coaxially positioned within the lower portion of the regeneration vessel containing the dense fluid bed of catalyst. The upper end of the cylindrical baffle 17 may be above or immersed within the catalyst bed upper interface with the bottom open end thereof positioned above and spaced apart from the air distributor grid 13 so that hot regenerated catalyst passing into the upper open end of the cylindrical baffle will pass downwardly therethrough into the fluid catalyst bed 7. It is contemplated partially plugging the air distributor grid adjacent the bottom opening of the cylindrical baffle 17 to assure downward flow of catalyst therethrough.

A downwardly sloping conical or annular baffle 19 provided with opening 21 extends inwardly from the vessel wall and is positioned within the vessel above inlet conduit 3 and below baffle 27 discussed below. An air distributor ring 23 supplied with regeneration gas such as air by conduit 25 is positioned beneath the lower central lip or edge of opening 21 in baffle 19 for introducing additional regeneration gas containing oxygen into the flue gas - catalyst suspension passing upwardly through opening 21. A second inverted conical baffle 27 provided with a concentric opening 29 therein is conically positioned above baffle 19. Conical baffle 27 is of a smaller diameter than the vessel thereby providing an annular opening 31 with the regenerator wall. Thus catalyst particles settled out of flue gases above baffle 27 pass outwardly and downwardly through the annular opening 31 onto baffle 19 and thence down to concentric opening 21 for return to the dense fluid bed of catalyst therebelow. A weir 33 on the upper surface of baffle 19 maintains a catalyst particle seal between baffles 27 and 19 at the lower outer periphery of baffle 27 thereby influencing the flow of regeneration flue gases upwardly through the concentric openings 21 and 29. Additional regeneration gas such as air may be combined with the flue gases by air distributor ring 35 supplied by conduit 37. Thus flue gases with entrained catalyst particles passing upwardly through the concentric opening may be contacted with additional amounts of oxygen containing flue gases to assure the complete conversion or burning of coke on catalyst particle and carbon monoxide to carbon dioxide. As discussed above with respect to FIG. I, flue gases containing entrained catalyst fines are caused to flow through a region of reduced velocity promoting the separation by settling of entrained fines. Thereafter the flue gases pass through a plurality of cyclone separators represented by separators 39 and 41 provided with catalyst diplegs 43 and 45. Flue gases are then passed from the cyclone separators by conduits 47 and 49 into a plenum chamber 51 from which they are withdrawn by conduit 53. Diplegs 43 and 45 extend downwardly into the dense fluid bed of catalyst 7 and preferably discharge separated catalyst into a lower portion of the fluid bed above grid 13. The regeneration vessel of FIG. II is designed particularly to promote the conversion of coke to carbon dioxide and the operating parameters of temperature, space velocity, catalyst density and air rates are all selected with a view to accomplishing this end. Thus catalyst particle density in the dense fluid catalyst bed and in the dispersed catalyst phase thereabove will vary over a range of from about 35 lbs/cu.ft. to about 3 lbs/cu.ft.; the regenerator temperatures will vary from about 1,100°F. up to about 1,400° or 1,500°F. and the regeneration air rates or oxygen concentration of the regeneration gases is selected to assure the complete conversion to carbon dioxide of carbonaceous material.

It will be understood by those skilled in the art that the operating parameters of the regenerator design shown in the drawings may be varied over a considerable range to accomplish regeneration of fluidizable catalyst particles. However, the design is directed particularly to accomplishing the burning of carbonaceous deposits on catalyst particles and the complete conversion of any formed carbon monoxide to carbon dioxide in such a manner that the catalyst particles will be better able to adsorb heat generated by the system.

Having thus generally described the method and system of the present invention and discussed a specific embodiment going to the very essence thereof, it is to be understood that no undue restrictions are to be imposed by reason thereof except as defined by the following claims.

I claim:

1. A method for regenerating finely divided solid catalyst particles containing carbonaceous deposits which comprises, maintaining a dense fluid bed of solid catalyst particles in the lower portion of a regeneration zone and a dispersed phase of catalyst particles thereabove by passing an oxygen containing regeneration gas upwardly therethrough, passing gaseous products of regeneration with entrained solid catalyst particles into said dispersed phase of catalyst particles above said dense fluid bed of catalyst particles and through one or more coaxially positioned restricted circular openings of high turbulence, introducing catalyst particles containing carbonaceous deposits into an upper portion of said dense fluid bed of catalyst particles, withdrawing regenerated catalyst particles from a lower portion of said dense fluid bed of particles, introducing additional oxygen containing regeneration gas into said gaseous products passing through said restricted openings of high turbulence under conditions to promote conversion of carbon monoxide to carbon dioxide and returning catalyst particles separated from gaseous products above said restricted openings to said dense fluid bed of particles.

2. The method of claim 1 wherein the entrained catalyst is heated by conversion of carbon monoxide to carbon dioxide and heated catalyst particles are returned to said dense fluid from said dispersed phase of catalyst outside of said restricted opening of high turbulence.

3. The method of claim 1 wherein the entrained catalyst is heated by conversion of carbon monoxide to carbon dioxide and heated catalyst particles are returned to said dense phase of catalyst through said restricted opening of turbulence.

4. The method of claim 1 wherein entrained catalyst particles are separated from gaseous products by cyclonic separation and separated catalyst is returned to a lower portion of said dense fluid bed of catalyst particles.

5. The method of claim 1 wherein catalyst particles are separated from gaseous products of regeneration in said dispersed phase of catalyst and the separated catalyst is returned to the periphery of the dense fluid bed of catalyst as an annular curtain of particles.

* * * * *